United States Patent [19]

Bailly et al.

[11] 4,377,791

[45] Mar. 22, 1983

[54] PHASE DISPLACEMENT MODULATOR HAVING FOUR QUADRANT PHASES

[76] Inventors: Roland Bailly, 62, rue de l'Egalite 114 La Flèche, F-92131 Issy-less-Moulineaux; Daniel Duponteil, 45-rue Anatole France, F-92370 Chaville, both of France

[21] Appl. No.: 200,470

[22] Filed: Oct. 24, 1980

[30] Foreign Application Priority Data

Oct. 31, 1979 [FR] France ............................... 79 27518

[51] Int. Cl.³ ........................................... H04L 27/20
[52] U.S. Cl. ................... 332/9 R; 332/16 R; 332/23 R; 375/54; 375/67
[58] Field of Search ..................... 332/9 R, 9 T, 16 R, 332/16 T, 21, 23 R; 375/52–57, 67

[56] References Cited

U.S. PATENT DOCUMENTS

| | | | |
|---|---|---|---|
| 3,659,202 | 4/1972 | Kaneko ................................ | 375/53 |
| 3,816,657 | 6/1974 | Fletcher et al. ...................... | 375/53 |
| 4,206,423 | 6/1980 | Nossen ................................. | 332/9 R |
| 4,210,879 | 7/1980 | Poitevin et al. ..................... | 332/9 R |

FOREIGN PATENT DOCUMENTS

2406909  5/1979  France .

*Primary Examiner*—Siegfried H. Grimm
*Attorney, Agent, or Firm*—Laff, Whitesel, Conte & Saret

[57] ABSTRACT

A four stage phase displacement modulator has a numerical signal generator with four outputs, which respectively deliver four signals, each signal having a frequency which is equal to the carrier frequency. The respective phases of the four stages are 0, $\pi/2$, $\pi$, and $3\pi/2$, which respectively appear at four inputs of a encoding device. In addition, the encoding device has two governing inputs which respectively receive two successions of impulses which constitute the modulating signal. The output of the encoding device is connected to the input of a band-pass filter, the output of which delivers the four phase modulated signal. The encoding device has a validation input to which is coupled the output of a monostable flip-flop driven by a clock signal at the rhythm of pairs of binary bits applied to the encoding device. Variable capacitors adjust the dephasings between the delivered signals.

2 Claims, 9 Drawing Figures

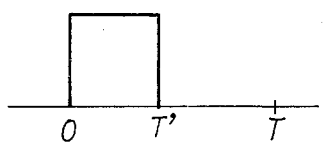
FIG.5
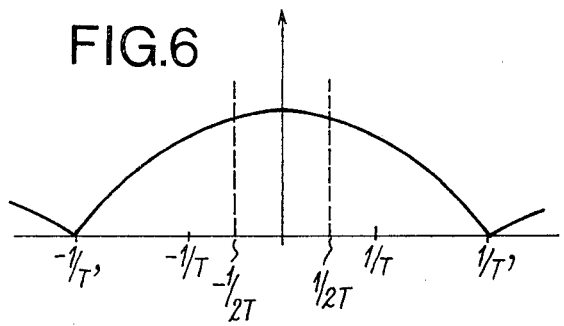
FIG.6
FIG.7
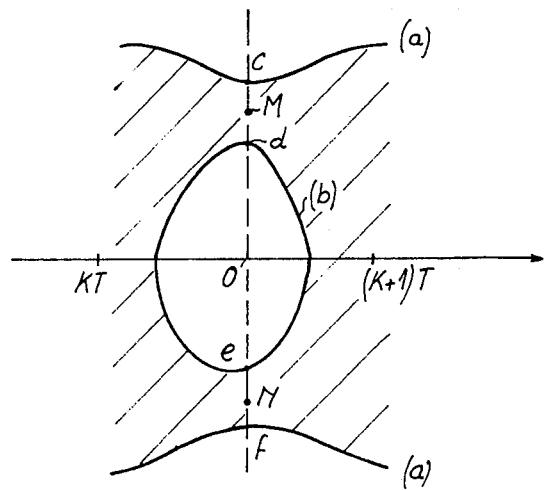
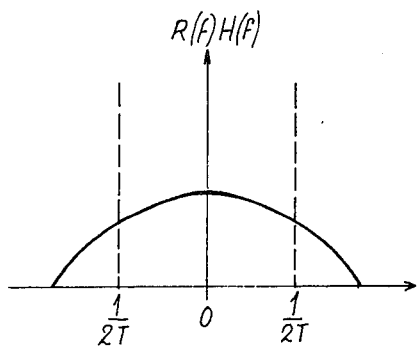
FIG.8
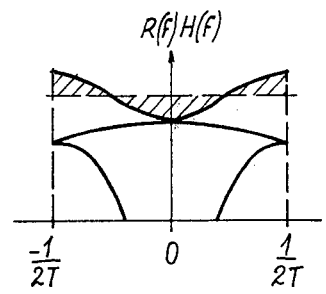
FIG.9

PHASE DISPLACEMENT MODULATOR HAVING FOUR QUADRANT PHASES

The present invention relates to a modulator using phase displacement with four states which, hereafter, will be designated more briefly as MDP4 modulator. It more especially relates to a modulator of the type which comprises a numerical signal generator comprising four outputs which respectively deliver four signals the frequencies of which are equal to the carrier frequency and have the respective phases 0, $\pi/2$, $\pi$ and $3\pi/2$. These phases are respectively applied to four inputs of a decoding device comprising two governing inputs, to which are respectively applied the two pulse trains constituting the modulating signal. The output of the decoding device is connected to the input of a band-pass filter, the output of which delivers the MDP4 signal.

A signal with modulation by phase displacement in four states, or an MDP4 signal, is formed of a sinusoidal carrier the frequency of which is fo, which assumes a phase state (among four possible phase states: 0, $\pi/2$, $\pi$ and $3\pi/2$), as a function of the modulating numerical signal.

In order to illustrate the state of the technique, it is possible to mention the modulators described in French Pat. No. 2 406 909, and in U.S. Pat. Nos. 3,816,657 and 3,659,202. The construction of those modulators use, practically, only logical circuits, this ensuring a low cost, a good dependability, and no regulating (adjusting). The modulator is practically independent of the carrier frequency as well as the numerical rate of delivery, and thus permitting a generalized use.

Moreover, it is well known that, in a numerical transmission, especially an MDP4 transmission, the two major causes of degradation of performance are, for one part, the additive thermal noise and, for the other part, the interference between symbols, resulting from the filtering of the modulating signal.

A conventional modulator uses NRZ impulses in which the modulating pulse trains are impulse successions of duration T, the amplitude of which is either $+1$ or $-1$, depending on the binary symbol to be transmitted. For such a transmission with a binary rate of delivery 2/T, there is known ideal filtering which eliminates the interference between symbols. The emission and reception filters have characteristics with the appearance indicated in FIG. 1. The reception filter is a 3 dB filter with a band width 1/T, and the emission filter is equal to the reception filter multiplied by the function $\pi fT/\sin(\pi fT)$, this giving it the good characteristics on each side of the central frequency, which is the frequency of the carrier.

Consequently, in order to execute an ideal filtering, it is necessary to provide for a compensation in amplitude for the emission filter and to equalize the filters during group propagation.

One object of the present invention is to provide for an MDP4 modulator which makes the so-called ideal filters simpler to execute.

According to a characteristic of the invention, a demodulator of the type defined above, has a decoding device with a validation input connected to the output of a monostable flip-flop to the input of which there is applied the clock signal at the rhythm of the pairs of binary bits applied to the decoding device. The monostable flip-flop has its output activated only during a fraction of the period of the clock signal.

According to another characteristic, between the outputs of said generator and the mass, there are variable condensers which adjust the dephasings between the signals delivered by the second and the third dividers.

The above-indicated characteristics of the invention, as well as others, will appear more clearly upon a reading of the description of embodiments of the invention, the description being given relative to the attached drawing, in which:

FIG. 5 represents an impulse wave shape which illustrates the functioning of the circuit according to FIG. 4.

FIG. 6 represents the spectrum of the impulse in FIG. 5.

FIG. 7 represents the diagram of the eye, in a schematic manner.

FIG. 8 represents the spectrum of the impulse received, and

FIG. 9 gives the frequency distribution of the interference noise.

Figure 2:
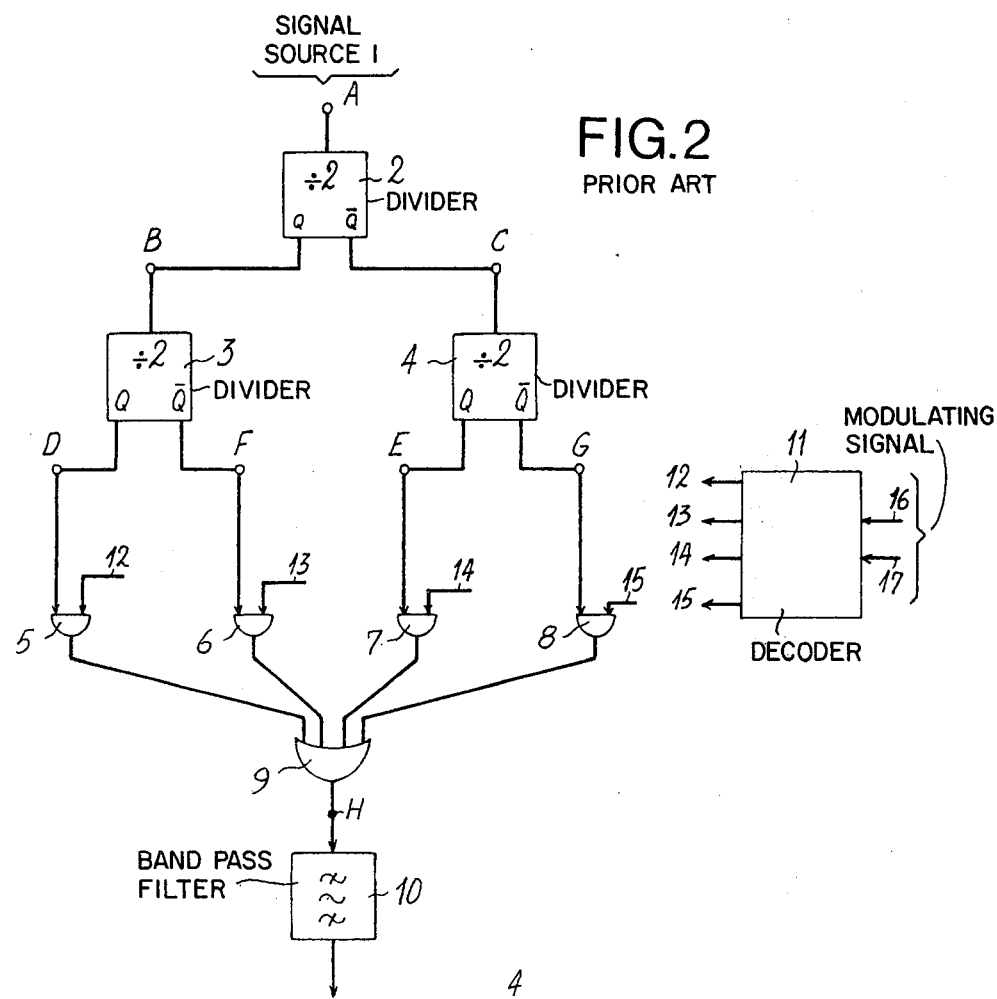
FIG. 2 is the diagram of an example of a known MDP4 modulator.

The MDP4 modulator according to FIG. 2 comprises a source 1 of high-frequency rectangular signals, the output of which is connected to the input A of a divider by two 2. The output Q of the divider by two 2 is connected to the input B of a divider by two 3, while its output $\overline{Q}$ is connected to the input C of a divider by two 4. The output Q of divider 3 is connected to the first input D of an AND gate 5 while the output $\overline{Q}$ is connected to the first input F of an AND gate 6. The output Q of divider 4 is connected to the first input E of an AND gate 7 while output $\overline{Q}$ is connected to the first input G of an AND gate 8. The outputs of AND gates 5 to 8 are respectively connected to the inputs of an OR gate 9, the output of which is connected to the input of a band-passing filter 10.

The modulator is completed by a decoding device 11, the four outputs 12 to 15 of which are respectively connected to the second inputs of AND gates 5 to 8. Decoding device 11 comprises an input with two wires 16 and 17, to which are applied the binary elements or bits of the modulating signal.

Figure 3:
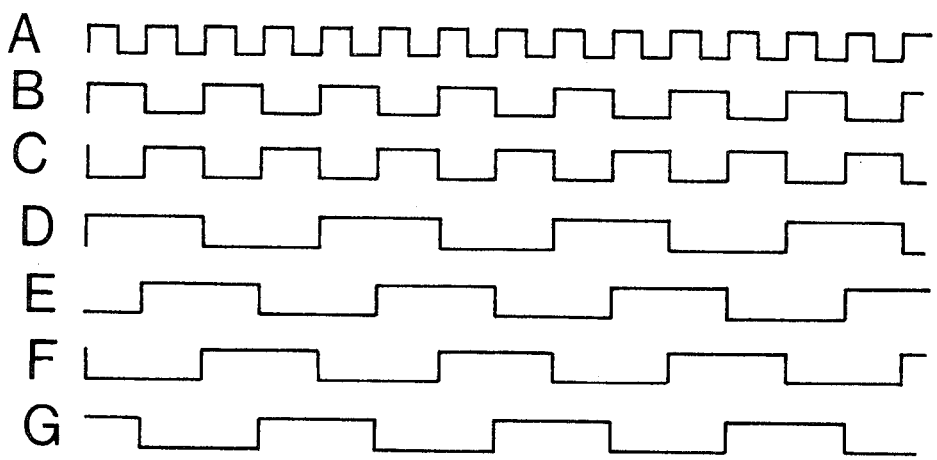
FIG. 3 represents the wave shapes of signals at various points of the circuit in FIG. 2.

The functioning of the modulator in FIG. 2 is as follows. The signal (FIG. 3A) from source 1 is applied to the input A at a frequency equal to 4 fo, in which fo is the frequency of the carrier which may, for example, be of the order of 78 MHz. To each quaternary symbol 00, 01, 10 or 11, constituted by a pair of binary bits applied at the rhythm of a clock, for example, with a frequency in the order of 10 MHz, to the input wires 16 and 17, there corresponds one of the outputs 12 to 15 which is activated during a clock period. In addition, to the input B of divider 3, there is applied the 2fo frequency signal which is shown in FIG. 3B. To the input C of divider 4 there is applied the signal of frequency 2fo, but the phase of which is opposite that of the signal applied to input B, as shown in FIG. 3C. To the first inputs D, F, E and G of the corresponding AND gates 5, 6, 7 and 8 there are applied signals of frequency fo which, as shown in FIGS. 3D, 3F, 3E, 3G, are shifted by $\pi/2$. During the period of a symbol, depending on the value of said symbol, one of the outputs of decoding device 11 is activated, and the corresponding AND gate therefore is opened, the other three gates being then inhibited. Therefore, at the output of OR gate 9, there is obtained an MDP4 signal having a carrier with a rectangular wave form. Band-passing filter 10, centered around the fo frequency, makes it possible to eliminate the harmonics with multiple frequencies of fo. Thus, at the output of band pass filter 10, there is obtained a modulated sinusoidal signal, that is to say an MDP4 signal.

In practice, filter 10 is constituted by the emission filter which usually is present in all connections.

It will be seen, in an obvious manner, that the modulator in FIG. 2, filter 10 being in the emission equipment properly speaking, is formed only of logical circuits, this making it very easy to manufacture. Besides, it is extremely simple.

The diagram of principle of modulator MDP4 may be extended to a phase displacement modulator with $N = 2^n$ states. The signal applied to the input of the modulator must then have the frequency Nfo. The modulator comprises a series of divider-by-two circuits making it possible to obtain N square signals the phases of which are 0, $2\pi/N$, $4\pi/N$, ... $2(N-1)\pi/N$. A logical decoding circuit makes it possible to open a gate among N gates.

Figure 4:
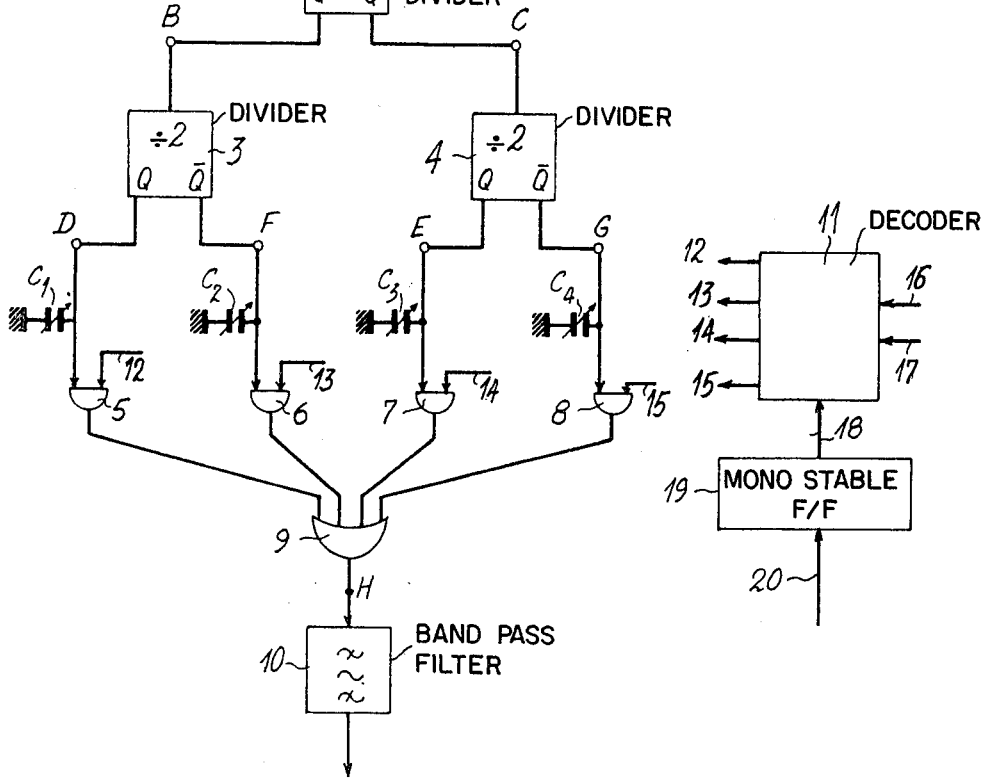
FIG. 4 is the diagram of an embodiment of an MDP4 modulator according to the present invention.

The modulator in FIG. 4 is identical with the one on FIG. 2, with the exception that it comprises a monostable flip-flop 19, the output of which is connected to the validation input 18 of decoding device 11. The clock signal of frequency 1/T is applied to the input 20 of flip-flop 19.

Flip-flop 19 is put into the work state, for example, at each rising front of the clock signal, and it is in its activated output for a time period T' which is shorter than the period T of the clock signal. For each symbol applied to the inputs 16 and 17 of decoder 11, the corresponding output of band pass filter 10 will be activated only for a time length T' which is shorter than time length T. The AND gate, therefore, which has been opened by that output, will remain opened only during time length T'. The rest of the time, the other gates are inhibited during the time length T, OR gate 9 will not let any signal go through. The modulator in FIG. 4 is a modulator with a cyclic ratio of less than 1. As shown in FIG. 4, there are also capacitors C1 to C4 respectively mounted between the inputs D, F, E, G on one side, and the mass on the other side. The variable capacitors C1 to C4 make it possible to adjust the phases of the four signals 3D to 3G with one degree of accuracy.

The addition of monostable flip-flop 19 is to reduce to a minimum the interference between symbols. The advantages obtained, in this respect, by the modulator in FIG. 4 may be explained in the following manner.

Figure 1:
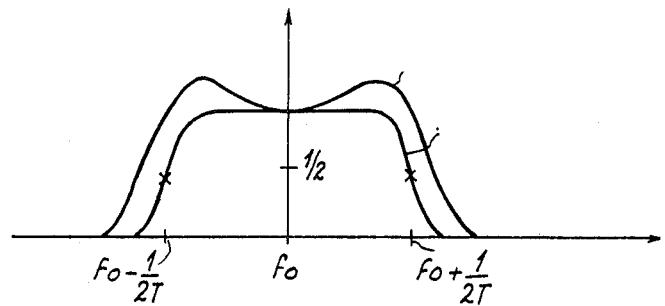
FIG. 1 represents amplitude-frequency diagrams which illustrate the characteristics of ideal filters both for emission and for reception.

In a conventional modulator using NRZ impulses in which the modulating successions are successions of impulses having a duration T, the amplitude of which is either +1 or −1, depending on the binary symbol to be transmitted, it is well known, as already stated above, to use an ideal filtering obtained with a filter the reception band of which is 1/T, with 3 dB, and an emission filter which is equal to the reception filter multiplied by the function $\pi fT/\sin(\pi fT)$. The characteristics of such filters are illustrated in FIG. 1. In fact, the amplitude compensation caused by the emission filter is related to the form or the shape of the impulse used. When the impulses have a cyclic ratio T/T' the amplitude compensation of the emission filter has the shape $$\frac{\pi fT'}{\sin(\pi fT')}.$$

It can, therefore, be seen quickly that, for a cyclic ratio which tends toward 0, the $$\frac{\pi fT'}{\sin(\pi fT')}$$

ratio remains constant in the band of the filter.

More precise calculations show that with a cyclic ratio of 1/4, it is possible to neglect the amplitude compensation of the emission filter, thus making it possible to simplify the filter.

As an indication, FIG. 5 shows an impulse shape, the cyclic ratio of which is T'/T, and FIG. 6 shows the spectrum of the $$\frac{\sin(\pi fT')}{\pi fT'}$$

impulse. FIG. 6 indicates the limits $-\frac{1}{2}T$ and $+\frac{1}{2}T$ of a filtering band, which are of the same order of width as the bands in FIG. 1. It can be seen that the amplitude is almost constant in the band $-\frac{1}{2}T$, $+\frac{1}{2}T$.

It is, moreover, known that the eye diagram (FIG. 7) makes it possible to visualize the distortion of the signal demodulated before the sampling and decision making. The eye diagram is obtained by observing that signal on a synchronized oscilloscope by means of its numerical rate of delivery. When there is no noise on the connection, the eye diagram assumes the shape indicated in FIG. 7. The signal is cut into slices of a duration T, and placed between the curves (a) and (b). The optimum sampling time, which gives the best error rate, corresponds to the exact time when the eye opening is at its maximum, that is to say at the maximum of curve (b).

Every second, the signal sampling (FIG. 7) occurs either between points c and d, or between points e and f. That fluctuation of the signal amplitude is characteristic of the existence of interferences between symbols, a source of degradation of the performances. The higher the ratio cd/OM, in which M is the middle of cd just as N is the middle of ef, indicates more interference between symbols.

With reference to technical works, such as, for example, the technical article titled "Some extensions of Nyquist Telegraph Transmission Theory" by Gibby and Smith and which appeared in the Bell System Technical Journal of December, 1965, that interference between symbols may be considered as a noise and that type of disturbance may be characterized by a signal/-noise ratio. It can be shown that the power of the interference between symbols may easily be related to the total filtering H(f), and to the spectrum of the R(f) impulse, R(f) being translated around the carrier frequency. There is, then, worked out the following function:

$$\sum_n R\left(f + \frac{n}{T}\right) \cdot H\left(f + \frac{n}{T}\right)$$

By a successive folding back of R(f).H(f) in a frequency band the width of which is 1/T, as represented in FIG. 8, it can be shown that the interference variation between symbols is equal to the quadratic deviation between that function and its mean value, that is to say the area of the shaded zone of the curve in FIG. 9.

When the cyclic ratio of the impulses is caused to vary, the function R(f) varies in the same manner as $\pi fT'/\sin(\pi fT')$ and the signal to interference noise ratio between symbols passes through a maximum. In addition to the thermal noise and the interference between symbols, other disturbances also exist, such as, especially, the garblings resulting from other modulated carriers. But it is nonetheless true that, for a given relationship and for a given E/No ratio, in which E is the power of the signal emitted per binary bit and No is the monolateral specter density of the noise, there is a cyclic ratio T'/T which gives a minimum rate of error. Adjusting the impulse duration gives an additional degree of freedom in the regulating of the relationship.

It thus appears that the introduction of a regulating circuit for the cyclic ratio of the impulses, in conventional modulators, makes possible the use of simpler filters. The possibility of a regulating of the cyclic ratio further makes it possible to maintain a margin in the accuracy of execution of the filters.

We claim:

1. A phase displacement modulator using four phases, said modulator comprising carrier signal source means having a predetermined carrier frequency, numerical signal generator means having four outputs which respectively deliver four signals each having the carrier frequency, means coupled to the four outputs of said generator means for adjusting a dephasing between the signals appearing thereat, the respective phases of said four outputs being 0, $\pi/2$, $\pi$, and $3\pi/2$, encoder means having four inputs which are respectively connected to the four outputs of said numerical signal generator means, said encoder means having two governing inputs, means for respectively applying a modulating signal to the two governing inputs, said modulating signals being two successions of impulses, band pass filter means, said encoder means having four outputs which are connected to the input of said band pass filter means having an output which delivers a four state phase displacement modulated signal, and monostable multivibrator means driven responsive to a clock pulse stream having the same frequency as the binary modulating signal, said encoder means having a validation input which is connected to the output of said monostable multivibrator, the monostable multivibrator means having its output activated only during a fraction of the clock signal period.

2. The modulator of claim 1 wherein said dephasing means are variable capacitors coupled to said four outputs.

* * * * *